US008699428B2

(12) United States Patent
Larmo et al.

(10) Patent No.: US 8,699,428 B2
(45) Date of Patent: Apr. 15, 2014

(54) METHOD AND ARRANGEMENT FOR EFFICIENTLY UTILIZING RADIO RESOURCES IN A COMMUNICATION NETWORK

(75) Inventors: Anna Larmo, Helsinki (FI); Johan Torsner, Masaby (FI); Mats Sagfors, Kyrkslatt (FI); Bela Rathonyi, Lomma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 664 days.

(21) Appl. No.: 12/447,233

(22) PCT Filed: Oct. 27, 2006

(86) PCT No.: PCT/SE2006/050431
§ 371 (c)(1),
(2), (4) Date: Apr. 24, 2009

(87) PCT Pub. No.: WO2008/051126
PCT Pub. Date: May 2, 2008

(65) Prior Publication Data
US 2010/0091721 A1    Apr. 15, 2010

(51) Int. Cl.
H04W 4/00 (2009.01)
H04L 1/18 (2006.01)

(52) U.S. Cl.
CPC ............. *H04L 1/1851* (2013.01); *H04L 1/1825* (2013.01); *H04L 1/1829* (2013.01)
USPC ....................................................... 370/329

(58) Field of Classification Search
CPC .................................................. H04L 1/1851
USPC ....................................................... 370/329
See application file for complete search history.

(56) References Cited

U.S. PATENT DOCUMENTS

2003/0016698 A1    1/2003    Chang et al.
2005/0157696 A1    7/2005    Yamamoto
(Continued)

FOREIGN PATENT DOCUMENTS

EP    1 411 672 A2    4/2004
EP    1411672 A2 *    4/2004
(Continued)

OTHER PUBLICATIONS

3GPP TSG-RAN WG2 Meeting #55, Seoul Korea, Oct. 9-13, 2006. Entire document, Nokia.*

(Continued)

*Primary Examiner* — Mark Rinehart
*Assistant Examiner* — Maharishi Khirodhar
(74) *Attorney, Agent, or Firm* — Myers Bigel Sibley & Sajovec, P.A.

(57) ABSTRACT

The present invention relates to a method and an arrangement for obtaining efficient radio resource utilization over a radio interface in a communication network comprising a transmitting entity (18) transmitting data over said radio interface to a receiving entity (15), said transmitting entity (18) comprising at least an upper layer utilizing an automatic repeat request (ARQ) protocol on top of a lower layer utilizing a hybrid automatic repeat request (HARQ) protocol, whereby a timer in said upper layer is arranged to supervise operation of said upper layer. Said timer is set based on an indication of receipt status of the transmitted data in said receiving entity (15) according to said lower layer hybrid automatic repeat request protocol.

20 Claims, 4 Drawing Sheets

(56) References Cited

U.S. PATENT DOCUMENTS

| | | | |
|---|---|---|---|
| 2005/0249118 A1 | | 11/2005 | Terry et al. |
| 2005/0276266 A1* | | 12/2005 | Terry .............................. 370/394 |
| 2007/0168826 A1* | | 7/2007 | Terry et al. .................... 714/748 |

FOREIGN PATENT DOCUMENTS

| | | |
|---|---|---|
| EP | 1 487 162 A1 | 12/2004 |
| JP | 2003-111147 A | 4/2003 |
| JP | 2005-204078 A | 7/2005 |
| JP | 2007-536823 A | 12/2007 |
| WO | WO 2004/042953 A1 | 5/2004 |
| WO | WO 2005/112327 | 11/2005 |

OTHER PUBLICATIONS

3GPP TSG-RAN2 Meeting #49, Seoul Korea, Nov. 7-11, 2005, R2-052800,Samsung, HARQ assisted ARQ operation, entire document.*
3GPP TSG-RAN2 Meeting #49, Seoul Korea, Nov. 7-11, 2005, R2-052800.Samsung, entire document, Harq assisted Arq operation.*
OSI A model for Computer communications Standards, Uyless Black, Prentcie Hall, Englewood Cliffs, New jersey 07632,1991, pp. 8-12.*
International Search Report dated May 18, 2007 (3 pages).
International Preliminary Report on Patentability dated Nov. 13, 2008 (6 pages).
"HARQ-ARQ interaction," 3GPP TSG RAN-WG2 Meeting #52, R2-060826, Athens, Greece, Mar. 27-31, 2006.
"ARQ Operation with HARQ-ARQ Interaction," 3GPP TSG-Ran WG2 Meeting #55, R2-062765, Seoul, Korea, Oct. 9-13, 2006.
3GPP TR 25.813, V7.1.0, $3^{rd}$ Generation Partnership Project; Technical Specification Radio Access Network, Evolved Universal Terrestrial Radio Access (E-UTRA), and Evolved Universal Terrestrial Radio Access Network (E-UTRAN), Radio interface protocol aspects, (Release 7), Sep. 2006.
Notification of Transmittal of International Preliminary Report on Patentability for PCT/SE2006/050431, mailed: Nov. 13, 2008, 8 pages.
Written Opinion of the International Searching Authority for PCT/SE2006/050431, mailed May 18, 2007.
Japanese Office Action (3 pages) corresponding to Japanese Patent Application No. 2009-534532; Issue Date: Jan. 23, 2012.
Arty et al. "Method to Reduce Complexity for a HARQ Based ARQ Technique" U.S. Appl. No. 60/754,713, filed Dec. 29, 2005, 25 pages.
European Search Report Corresponding to European Application No. 06813051.7; Dated: Apr. 11, 2012; 3 Pages.
European Office Action Corresponding to European Application No. 06813051.7; Dated: May 2, 2012; 8 Pages.
Chandra et al. "Method to Reduce Complexity for a HARQ Based ARQ Technique", U.S. Appl. No. 60/754,713, filed Dec. 29, 2005.
Chinese Office Action Corresponding to Chinese Application No. 200680056232.2; Dated: Jul. 4, 2012; English Translation, 11 Pages.
Japanese Office Action Corresponding to Japanese Patent Application No. 2009-534532; Dated: Jul. 6, 2012; Foreign Text, 2 Pages, English Translation Thereof, 2 Pages.
Chinese Decision on Rejection Corresponding to Chinese Patent Application No. 200680056232.2; Date of Issue: Dec. 24, 2012; Foreign Text, 7 Pages, English Translation Thereof, 2 Pages.
Japanese Notice of Allowance Corresponding to Japanese Patent Application No. 2009-534532; Mailing Date: Dec. 17, 2012; 3 Pages (Foreign Text Only).
European Office Action Corresponding to European Patent Application 06 813 051.7; Dated: Jun. 14, 2013; 9 pages.

* cited by examiner

METHOD AND ARRANGEMENT FOR EFFICIENTLY UTILIZING RADIO RESOURCES IN A COMMUNICATION NETWORK

TECHNICAL FIELD

The present invention relates to a method and an arrangement in a communication network, and in particular to an arrangement allowing for efficiently utilizing radio resources over a radio interface as well as a method for such utilization. The invention also relates to a user equipment for efficiently utilizing radio resources over a radio interface. The invention further relates to a computer-readable medium containing computer program for efficiently utilizing radio resources over a radio interface.

BACKGROUND OF THE INVENTION

Protocol timers are often used, e.g., in re-transmission protocols, so that a new message or action is repeated in case a desired outcome has not taken place before the timer has expired. This is the case, for example, in the Radio Link Control (RLC) protocol in the UMTS Terrestrial Radio Access Network (UTRAN), where various timers such as, e.g., the Poll Timer is defined. The purpose of this timer is to re-transmit a Poll after the expiry of the timer to cover the situation if the Poll (or the peer's Status report) has been lost over an error-prone link. Note that similar timers are used in almost all protocols striving for reliability, including signaling (layer 3) protocols.

The Enhanced Dedicated Channel (E-DCH) is an uplink transport channel defined in the Third Generation Partnership Project (3GPP) Rel 6. One new feature of E-DCH is the introduction of Hybrid Automatic Repeat Request (HARQ). HARQ is also used in High Speed Downlink Shared Channel (HS-DSCH), and it is planned for the Long Term Evolution (LTE) of UTRAN.

In the E-DCH protocol stack, shown in FIG. 2, there are then two layers of retransmissions. The first retransmitting entity is the HARQ protocol on the Medium Access Control (MAC) layer, which performs retransmissions based on a one bit acknowledgement/negative acknowledgement (ACK/NACK). If HARQ fails, or a NACK to ACK error occurs, out-of-sequence delivery is performed to the next retransmitting entity, which is the RLC automatic repeat request (ARQ) protocol. RLC then cares for the residual errors.

RLC is present at both ends of the connection; in the user equipment (UE) and in the radio network controller (RNC). Retransmissions are made based on STATUS reports, which on the other hand are performed based on timers and polling. In other words, RLC retransmissions can be controlled with RLC parameters including timer values and polling rules.

RLC was already present in the previous 3GPP releases, where no HARQ protocol was used, i.e. with Dedicated Control Channel (DCH) and Forward Access Channel/Random Access Channel (FACH/RACH). Most RLC timer values are therefore typically based on an estimate of the Round-Trip-Time (RTT) on the RLC layer. With HARQ in place, however, the calculation of RTT on the RLC layer becomes tricky. This is because the delay may vary substantially due to the HARQ, since a payload unit in a HARQ process can be subject to varying number of re-transmissions. The present specifications consider that the RTT can vary (mainly for RACH) but do not include suitable inter-layer communication for supporting the varying HARQ delay for E-DCH.

With HARQ in operation, a correct setting of the timers in upper-layer protocols is far from trivial. This is exemplified with an E-DCH having 10 ms Transmission Time Interval (TTI) with four HARQ processes. Suppose the number of HARQ re-transmissions vary between 1 and 8. Depending on the HARQ operation, the transmission delay can then vary between 10 ms and [7×40+10] ms=290 ms.

The RLC specification (TS 25.322) defines the start of many of its timers as follows:

"In the UE this timer shall be started (or restarted) when the successful or unsuccessful transmission of an AMD PDU containing a poll is indicated by lower layer"

Indeed, the MAC layer is specified to send an indication to RLC, when the RLC Protocol Data Units (PDU) has been submitted for transmission by the physical layer:

MAC-STATUS-Ind/Resp:

[ . . . ] At the UE, MAC-STATUS-Ind primitive is also used to indicate from MAC to RLC that MAC has requested data transmission by PHY (i.e. PHY-DATA-REQ has been submitted), or that transmission of an RLC PDU on RACH has failed due to exceeded preamble ramping cycle counter.

And further (the parameter indicating the status of the transmission):

TX status:

when set to value "transmission unsuccessful" this parameter indicates to RLC that transmission of an RLC PDU failed in the previous TTI, when set to value "transmission successful" this parameter indicates to RLC that the requested RLC PDU(s) has been submitted for transmission by the physical layer.

Thus, MAC is obligated to inform the RLC when the transmission of a PDU has commenced by the physical layer. However, there is no indication of the successful/unsuccessful reception of the PDU at the peer entity. In particular, there is no definition of how to use the indication when the RLC PDUs are carried over E-DCH with HARQ. Thus, the MAC specification is unclear in this respect.

As observed through the example above, the delay from the data request until a successful transmission with HARQ has been performed can vary significantly. Thus, in order to deal with this delay-variation, there is a need to update the specification such that the HARQ delay-variations can be catered for by the upper layers—particularly by RLC timers.

SUMMARY OF THE INVENTION

Accordingly, it is an objective with the present invention to provide an improved method for obtaining efficient radio resource utilization over a radio interface in a communication network comprising a transmitting entity transmitting packet data over said radio interface to a receiving entity, said transmitting entity comprising at least an upper layer utilizing an automatic repeat request protocol on top of a lower layer utilizing a hybrid automatic repeat request protocol, whereby at least one timer in said upper layer is arranged to supervise operation of said upper layer.

Another objective with the present invention is to provide an improved arrangement for obtaining efficient radio resource utilization over a radio interface in a communication network comprising a transmitting entity transmitting packet data over said radio interface to a receiving entity, said transmitting entity comprising at least an upper layer utilizing an automatic repeat request protocol on top of a lower layer utilizing a hybrid automatic repeat request protocol, whereby at least one timer in said upper layer is arranged to supervise operation of said upper layer.

A further objective with the present invention is to provide an improved user equipment for obtaining efficient radio resource utilization over a radio interface, comprising at least an upper layer utilizing an automatic repeat request protocol on top of a lower layer utilizing a hybrid automatic repeat request protocol, whereby at least one timer in said upper layer is arranged to supervise operation of said upper layer.

A still further objective with the present invention is to provide an improved computer-readable medium for obtaining efficient radio resource utilization over a radio interface in a communication network comprising a transmitting entity transmitting packet data over said radio interface to a receiving entity, said transmitting entity comprising at least an upper layer utilizing an automatic repeat request protocol on top of a lower layer utilizing a hybrid automatic repeat request protocol, whereby a timer in said upper layer is arranged to supervise operation of said upper layer.

Thanks to the provision of a method and an arrangement using an indication from a lower layer to make the operation of the upper layer more efficient, the amount of unneeded waiting times is reduced. And, by making the timer values more accurate, a more efficient transfer on the upper layer is obtained, minimizing problems of window stalling and unnecessary retransmissions. Thus, the radio resources are more efficiently utilized.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

Figure 1:
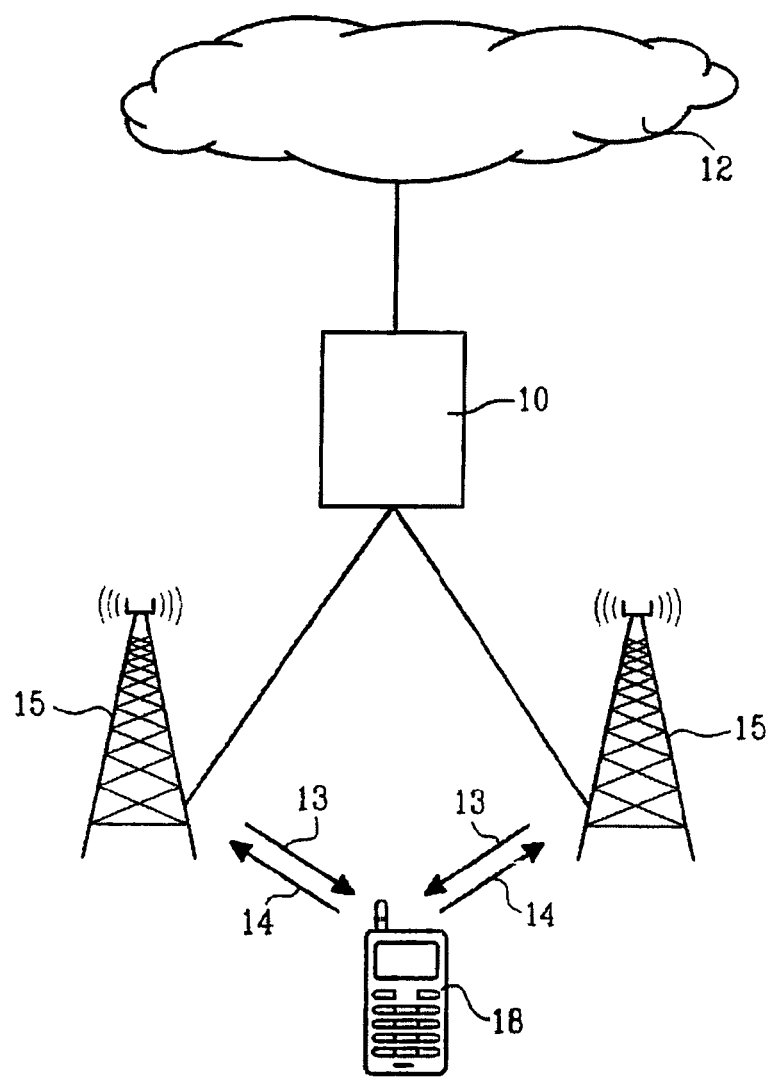
FIG. 1 shows the communication network architecture according to the present invention.
Figure 2:
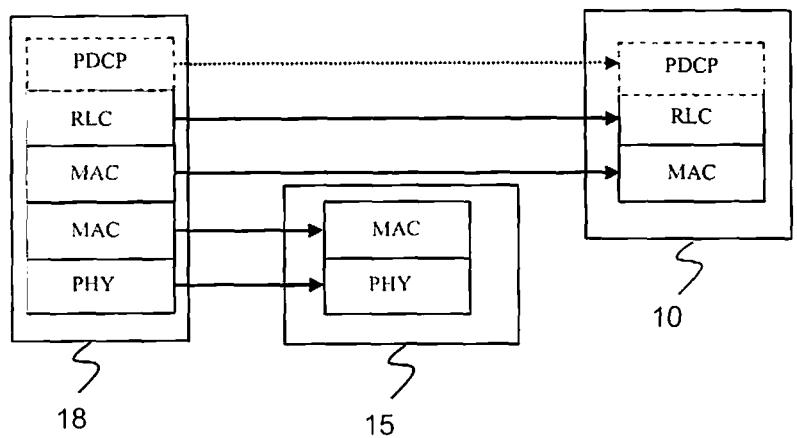
FIG. 2 shows the protocol termination for E-DCH, user plane.

FIG. 1 depicts a communication system, such as a Wideband Code Division Multiple Access (WCDMA) communication system, including a Radio Access Network (RAN), such as the UMTS Terrestrial Radio Access Network (UTRAN) architecture, comprising at least one Radio Base Station (RBS) (or Node B) 15 connected to one or more Radio Network Controllers (RNCs) 10. The RAN is connected to a Core network (CN) 12. The RAN and the CN 12 provide communication and control for a plurality of user equipments (UE) 18 (only one is shown in FIG. 1), that each uses downlink (DL) channels 13 and uplink (UL) channels 14 for transmitting and receiving data/signals. According to a preferred embodiment of the present invention, the communication system is herein described as a WCDMA communication system. The skilled person, however, realizes that the inventive method and arrangement works very well on other communications systems as well.

The key finding for the present invention is the fact that HARQ facilitates knowledge about when a PDU actually has been successfully received at the receiving peer-entity. Thus, the upper-layer protocol timers can be started based on the HARQ feedback.

Without the present idea, and using timer-values that account for the worst-case, HARQ delay may decrease the performance, because long timers might prevent window gliding and re-transmissions of lost data and signalling messages.

Below the invention is described by using primitives (or signals) that are exchanged between the different protocol entities in a similar way as is done in the 3GPP specifications. This is just a descriptive method and should not restrict the invention in any way. Further, according to a preferred embodiment of the present invention, the protocols used herein, i.e. RLC and MAC, are only examples taken from the current 3GPP specifications. The person skilled in the art realizes that the invention works well on other protocols as well.

As mentioned above the timers in RLC are usually set based on the RTT between the protocol entities. Different timers in RLC have different functionality such as supervision of peer entity response, prohibiting excessive transmissions of certain peer-to-peer signaling etc. This is not discussed further here.

Currently as described in 3GPP, relevant timers are started/re-started, when the PHY-DATA-REQ primitive has been sent from MAC and MAC has indicated this to the RLC with a MAC-STATUS-IND primitive in the parameter "TX Status".

According to the preferred embodiment of the present invention, the MAC-STATUS-IND provides a new parameter indicating the HARQ feedback status. The indication also includes a field indicating the number of HARQ attempts used. The triggering and content of the indication is based on the success or failure of the HARQ transmission, which is monitored by observing the ACK/NACK feedback response from the peer HARQ entity. This may also include the absence of the ACK/NACK feedback which then could be interpreted as a NACK. Reception of an ACK triggers an indication to RLC including information of successful delivery of the PDU. Similarly, the reception of a NACK could trigger an indication to RLC including information of unsuccessful delivery either every time a NACK is received or when the final re-transmission also failed. Alternatively, the triggering of the indication can be performed each time the number of HARQ re-transmissions exceeds a pre-defined number of attempts. Further, if MAC detects that the maximum number of HARQ transmissions has been exceeded without any ACK this can be indicated to RLC.

The upper-layer reaction to the proposed indications includes different possible embodiments: The main embodiment is to start and/or restart relevant timers based on the indication of successful or unsuccessful reception of the PDU by the peer HARQ entity. Another embodiment is to re-transmit the PDUs in case the aforementioned indication indicates a failure in the HARQ delivery.

According to the present invention a method is provided for obtaining efficient radio resource utilization over a radio interface in a communication network comprising a transmitting entity, such as a UE, transmitting data/signals over said radio interface to a receiving entity, such as the RNC or Node B, said entities comprising at least an upper layer, e.g. an RLC layer, utilizing an automatic repeat request (ARQ) protocol on top of a lower layer, e.g. a MAC layer, utilizing a hybrid automatic repeat request (HARQ) protocol, whereby at least one timer in said upper layer is arranged to supervise operation of said upper layer. The method comprises the step of setting said at least one timer based on an indication, e.g. an ACK/NACK message of receipt status of the transmitted data/signals in said receiving entity according to said lower layer HARQ protocol.

Also, according to the present invention a user equipment 18 is provided for obtaining efficient radio resource utilization over a radio interface, comprising at least an upper layer utilizing an automatic repeat request protocol on top of a lower layer utilizing a hybrid automatic repeat request protocol, whereby at least one timer in said upper layer is arranged to supervise operation of said upper layer. The user equipment comprises means for setting said at least one timer based on feedback of receipt status of the transmitted data in a receiving entity, such as the RNC or Node B, according to said lower layer hybrid automatic repeat request protocol.

Figure 3:
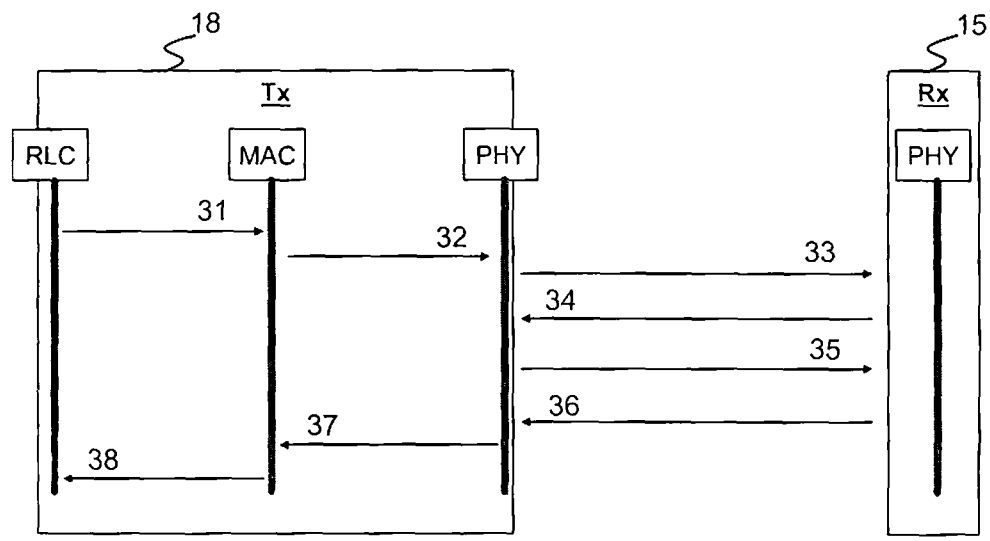
FIG. 3 is an information flow according to a first embodiment of the present invention.

FIG. 3 shows a flow chart according to a first preferred embodiment of the present invention, wherein the relevant RLC timers are started/re-started at the reception of feedback for a successful/unsuccessful delivery. When the RLC PDU is submitted to the physical layer for transmission, wait until an ACK (or HARQ failure) for that particular PDU(s) has been received. Thus, a MAC-DATA-Req 31 is sent from the RLC to the MAC and a PHY-DATA Req 32 is sent from the MAC to the Physical layer (PHY). A first HARQ transmission 33 is sent from the transmitter (the UE) to the receiver (the RBS). If the transmission is successfully received, the receiver sends an ACK 36 back to the transmitter. However, as long as the transmission is unsuccessfully received, the receiver sends a NACK 34 back to the transmitter, whereby the transmitter re-transmits the HARQ transmission 35 up to a pre-determined maximum number of re-transmissions. If no successful transmissions have been made after the maximum number of re-transmission, the transmission is seen as a HARQ failure. After having received an ACK of a HARQ failure at 36, the PHY sends a PHY-STATUS-Ind 37 to the MAC, whereby the MAC sends a MAC-STATUS-Ind 38 to the RLC.

Figure 4:
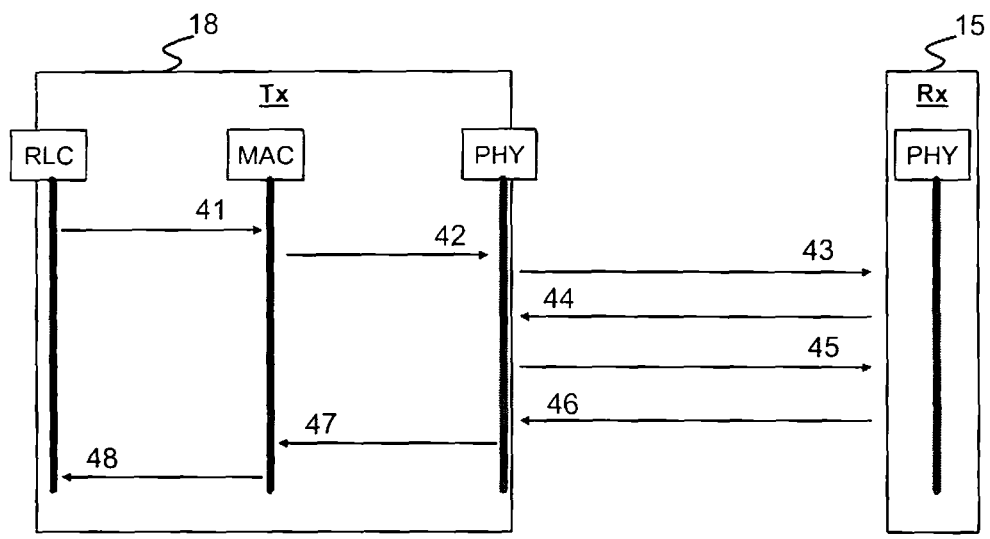
FIG. 4 is an information flow according to a second embodiment of the present invention.

FIG. 4 shows a flow chart according to a second preferred embodiment of the present invention, wherein the relevant RLC timers are started at the reception of feedback for the x:th HARQ transmission. When the PDU is submitted to the physical layer for transmission, wait until it has been sent and ACKed or sent for the x:th time and NACKed, and then notify the upper layers about the transmission status of the PDU. This solution enables slightly lower timer values, but does not fully utilize the HARQ information available. Thus, a MAC-DATA-Req 41 is sent from the RLC to the MAC and a PHY-DATA Req 42 is sent from the MAC to the Physical layer (PHY). A first HARQ transmission 43 is sent from the transmitter (the UE 18) to the receiver (the RBS 15). If the transmission is successfully received, the receiver sends an ACK back to the transmitter. However, as long as the transmission is unsuccessfully received, the receiver sends a NACK 44 back to the transmitter, whereby the transmitter re-transmits the HARQ transmission. If the transmission at a pre-determined number of re-transmissions 45, i.e. not the maximum number, still not is successfully received and being NACK:ed 46, the PHY sends a PHY-STATUS-Ind 37 to the MAC, whereby the MAC sends a MAC-STATUS-Ind 38 to the RLC.

According to a third preferred embodiment or the present invention (not shown), a direct re-transmission of the lost upper-layer PDU is performed based on the reception of a HARQ failure indication.

According to a fourth preferred embodiment of the present invention (not shown), the interaction between MAC-HARQ and RLC may also be deployed on the receiver side. The MAC-HARQ layer may in some conditions discover that an error in the HARQ feedback signalling has occurred. An example of this is when HARQ has requested a retransmission of a MAC PDU by sending a HARQ NACK but a new MAC PDU is received instead of the retransmission. This event is an indication of that a data loss has occurred on HARQ level and the event could be indicated to the RLC layer. The RLC layer may, when this indication is received, immediately transmit an RLC STATUS report to make the peer RLC entity aware of the data loss, even if the status prohibit timer is running. Alternatively, the RLC entity should only send the STATUS report if the status prohibit timer is not running when the indication from MAC is received.

Figure 5:
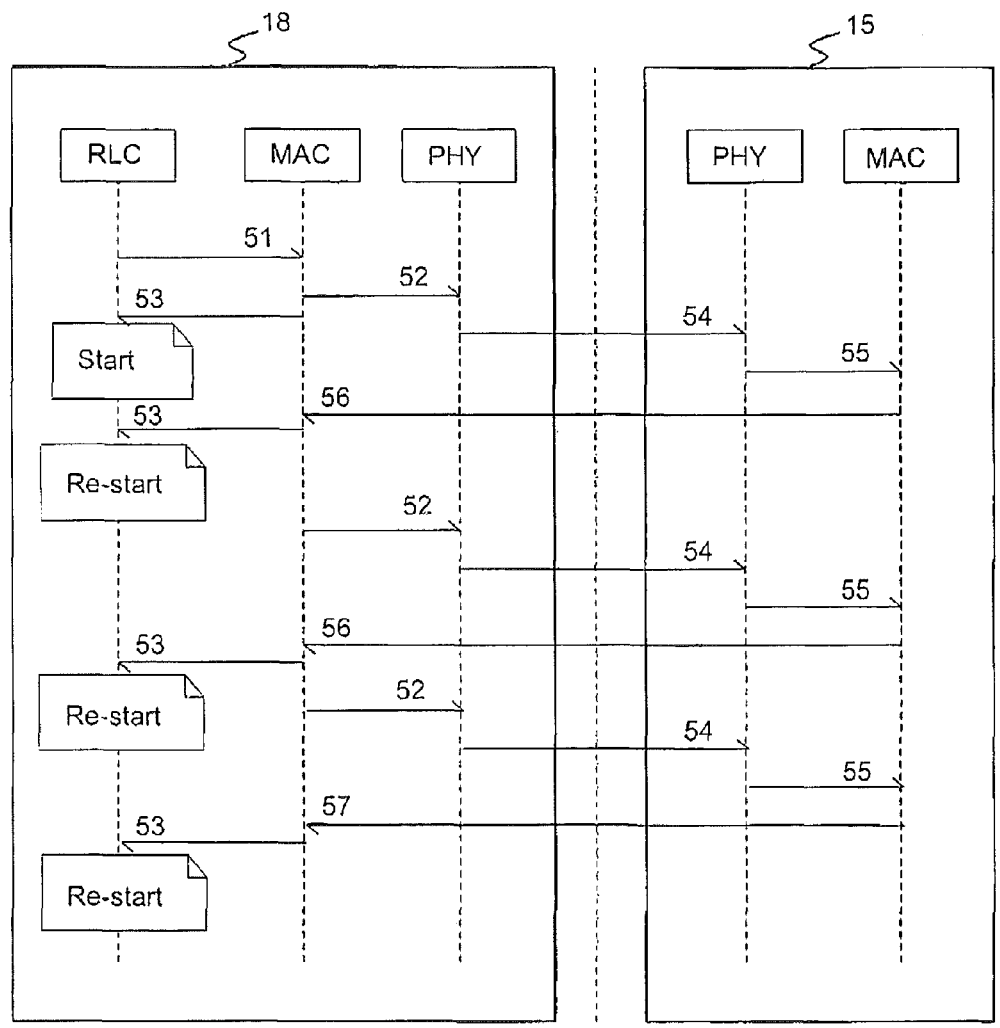
FIG. 5 is an information flow according to a fifth embodiment of the present invention.

FIG. 5 shows a flow chart according to a fifth preferred embodiment of the present invention, wherein the HARQ feedback information is sent from MAC to RLC for every transmission attempt in the HARQ entity. The timers in RLC are started at the first transmission attempt and then re-started as a result of the HARQ feedback response (ACK/NACK). It should be noted that the prohibiting function is started already before the timer, namely when the prohibit function is triggered. FIG. 5 shows the flow between the UE 18 and the RBS 15 (or Node B). The RLC layer of the UE 18 sends a MAC-DATA-REQ 51 to the MAC layer of the UE 18. The MAC layer sends a PHY-DATA-REQ 52 to the PHY layer of the UE 18 and a MAC-STATUS-IND 53 back to the RLC whereby the timers of the RLC layer are started. The PHY layer of the UE 18 sends a first HARQ transmission 54 to the PHY layer of the RBS 15, which sends a PHY-DATA-IND 55 to the MAC layer of the RBS 15. If the transmission is unsuccessfully received, the MAC layer of the RBS 15 sends a NACK 56 to the MAC layer of the UE 18, and the MAC of the UE 18 sends a MAC-STATUS-IND 53 to the RLC, whereby the timers are re-started. The procedure is repeated, i.e. the MAC of the UE 18 sends a PHY-DATA-REQ 52 to the PHY layer of the UE 18 and so forth. In the example of FIG. 5, the third transmission attempt is successfully received, whereby the MAC of the RBS 15 sends an ACK 57 back to the MAC of the UE 18.

Alternatively, according to a sixth preferred embodiment of the present invention (not shown), the RLC is changed to start a long timer, which is at least as long as the max transmission delay counting all HARQ transmission attempts, when the PDU is submitted for transmission. The timer is then re-started/updated with the correct timer value that is in the order of the RTT value according to the first preferred embodiment, i.e. when either an ACK or max number of re-transmissions is reached.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Figure 6:
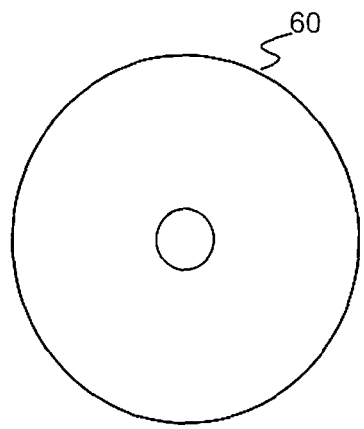
FIG. 6 shows a computer-readable medium.

Moreover, the invention can additionally be considered to be embodied entirely within any form of computer-readable storage medium, exemplary shown in FIG. 6 and denoted with 60, having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for obtaining efficient radio resource utilization over a radio interface in a communication network comprising a transmitting entity transmitting packet data over said radio interface to a receiving entity, said entities comprising at least an upper layer utilizing an automatic repeat request protocol on top of a lower layer utilizing a hybrid automatic repeat request protocol, whereby at least one timer in said upper layer is arranged to supervise operation of said upper layer, is provided wherein the computer program performs the step of setting said at least one timer based on an indication of receipt status of the transmitted packet data in said receiving entity according to said lower layer hybrid automatic repeat request protocol.

The invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "containing", "incorporating", "consisting or", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a transmitting entity for obtaining efficient radio resource utilization over a radio interface in a communication network comprising said transmitting entity transmitting data over said radio interface to a receiving entity, said transmitting entity comprising at least an upper layer utilizing an automatic repeat request protocol on top of a lower layer utilizing a hybrid automatic repeat request protocol, the method comprising:
    setting at least one timer based on an indication of receipt status of the transmitted data in said receiving entity according to said lower layer hybrid automatic repeat request protocol, wherein setting the at least one timer comprises setting the at least one timer based on the indication of receipt status being received at the upper layer from the lower layer; and
    supervising operation of the upper layer using the at least one timer;
    wherein said indication of receipt status of the transmitted data is sent from said lower layer to said upper layer for every transmission attempt of the transmitted data from the lower layer over the radio interface, wherein said at least one timer is started at the first transmission attempt of the transmitted data and re-started when said indication of receipt status of the transmitted data is received.

2. A method according to claim 1, where said indication of receipt status of the transmitted data indicates successful transmission of the transmitted data in said lower layer.

3. A method according to claim 1, where said indication of receipt status of the transmitted data indicates unsuccessful transmission of the transmitted data in said lower layer.

4. A method according to claim 3, where said indication of unsuccessful transmission of the transmitted data is sent from said lower layer to said upper layer after a pre-determined number of unsuccessful transmission attempts of the transmitted data has been made.

5. A method according to claim 1, where said indication of receipt status of the transmitted data is sent from said lower layer to said upper layer when a loss of the transmitted data has occurred.

6. A method according to claim 5, where the method further comprises:
    directly re-transmitting said lost data to said receiving entity when said indication of receipt status of the transmitted data is received in said upper layer.

7. A method according to claim 1, where said indication of receipt status of the transmitted data indicates a signaling error in said lower layer, and where a message of said signaling error is sent from said upper layer to a second receiving entity.

8. A method according to claim 1, where said at least one timer is set to last until a maximum number of transmission attempts of the transmitted data is reached.

9. A method according to claim 1, where said upper layer is a radio link control (RLC) layer and said lower layer is a medium access control (MAC) layer.

10. A method according to claim 1 wherein said at least one timer is started at the first transmission attempt of the transmitted data, wherein said at least one timer is re-started responsive to receiving a negative acknowledgment receipt status of the transmitted data, and wherein said at least one timer is re-started responsive to receiving a acknowledgment receipt status of the transmitted data.

11. An arrangement in a transmitting entity for obtaining efficient radio resource utilization over a radio interface in a communication network comprising said transmitting entity transmitting data over said radio interface to a receiving entity, said transmitting entity comprising at least an upper layer utilizing an automatic repeat request protocol on top of a lower layer utilizing a hybrid automatic repeat request protocol, the arrangement comprises:

means for setting at least one timer based on an indication of receipt status of the transmitted data in said receiving entity according to said lower layer hybrid automatic repeat request protocol, wherein the means for setting the at least one timer comprises means for setting the at least one timer based on the indication of receipt status being received at the upper layer from the lower layer; and means for supervising the upper layer using the at least one timer;

wherein said lower layer is arranged to send said indication of receipt status of the transmitted data to said upper layer for every transmission attempt of the transmitted data from the lower layer over the radio interface, wherein said at least one timer is started at the first transmission attempt of the transmitted data and restarted when said indication of receipt status of the transmitted data is received.

12. An arrangement according to claim 11, where said indication of receipt status of the transmitted data indicates successful transmission of the transmitted data in said lower layer.

13. An arrangement according to claim 11, where said indication of receipt status of the transmitted data indicates unsuccessful transmission of the transmitted data in said lower layer.

14. An arrangement according to claim 13, where said lower layer is arranged to send said indication of unsuccessful transmission of the transmitted data to said upper layer after a pre-determined number of unsuccessful transmission attempts of the transmitted data has been made.

15. An arrangement according to claim 11, where said lower layer is arranged to send said indication of receipt status of the transmitted data to said upper layer when a loss of the transmitted data has occurred.

16. An arrangement according to claim 15, where said transmitting entity is arranged to directly re-transmit said lost data to said receiving entity when said indication of receipt status of the transmitted data is received in said upper layer.

17. An arrangement according to claim 11, where said indication of receipt status of the transmitted data indicates a signaling error in said lower layer, where said upper layer is arranged to send a message of said signaling error to a second receiving entity.

18. An arrangement according to claim 11, where said means for setting said at least one timer is arranged to set said at least one timer to last until a maximum number of transmission attempts of the transmitted data is reached.

19. An arrangement according to claim 11, where said upper layer is a radio link control (RLC) layer and said lower layer is a medium access control (MAC) layer.

20. An arrangement according to claim 11 wherein said at least one timer is started at the first transmission attempt of the transmitted data, wherein said at least one timer is re-started responsive to receiving a negative acknowledgment receipt status of the transmitted data, and wherein said at least one timer is re-started responsive to receiving a acknowledgment receipt status of the transmitted data.

* * * * *

UNITED STATES PATENT AND TRADEMARK OFFICE
CERTIFICATE OF CORRECTION

| | | |
|---|---|---|
| PATENT NO. | : 8,699,428 B2 | Page 1 of 1 |
| APPLICATION NO. | : 12/447233 | |
| DATED | : April 15, 2014 | |
| INVENTOR(S) | : Larmo et al. | |

It is certified that error appears in the above-identified patent and that said Letters Patent is hereby corrected as shown below:

On the title page, item (75), under "Inventors", in Column 1, Line 2, delete "Mats Sagfors," and insert -- Mats Sågfors, --, therefor.

On the title page, item (75), under "Inventors", in Column 1, Line 3, delete "Kyrkslatt" and insert -- Kyrkslätt --, therefor.

In the Specification

In Column 7, Line 64, delete "or"," and insert -- of', --, therefor.

Signed and Sealed this
Third Day of March, 2015

Michelle K. Lee
*Deputy Director of the United States Patent and Trademark Office*